United States Patent
Sachdev et al.

(10) Patent No.: US 9,011,977 B2
(45) Date of Patent: Apr. 21, 2015

(54) CORROSION INHIBITORS IN BREAKABLE MICROCAPSULES TO PASSIVATE SCRATCHED METALS

(75) Inventors: Anil K. Sachdev, Rochester Hills, MI (US); Thomas C. Pederson, Rochester Hills, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1455 days.

(21) Appl. No.: 12/557,587

(22) Filed: Sep. 11, 2009

(65) Prior Publication Data

US 2011/0064941 A1    Mar. 17, 2011

(51) Int. Cl.
| | | |
|---|---|---|
| *B05D 3/02* | (2006.01) | |
| *B32B 27/02* | (2006.01) | |
| *C09K 3/00* | (2006.01) | |
| *C09D 5/08* | (2006.01) | |
| *C09D 7/12* | (2006.01) | |
| *C08K 3/16* | (2006.01) | |
| *C08K 3/28* | (2006.01) | |
| *C08K 3/30* | (2006.01) | |
| *C08K 9/10* | (2006.01) | |

(52) U.S. Cl.
CPC . *C09D 5/084* (2013.01); *C08K 3/16* (2013.01); *C08K 3/28* (2013.01); *C08K 3/30* (2013.01); *C08K 9/10* (2013.01); *C09D 7/1291* (2013.01)

(58) Field of Classification Search
USPC ......... 428/402.21; 427/388.1, 372.2; 252/387
See application file for complete search history.

(56) References Cited

U.S. PATENT DOCUMENTS

| | | | | |
|---|---|---|---|---|
| 3,505,244 A | * | 4/1970 | Cessna | 252/391 |
| 5,006,588 A | * | 4/1991 | Miller | 524/406 |
| 5,082,536 A | * | 1/1992 | Izaki et al. | 205/109 |
| 5,269,956 A | * | 12/1993 | Miller et al. | 252/67 |

(Continued)

FOREIGN PATENT DOCUMENTS

| | | |
|---|---|---|
| DE | 10058595 | 6/2002 |
| DE | 69817624 | 6/2004 |

(Continued)

OTHER PUBLICATIONS

James E. Kloeppel; New polymer coating prevent corrosion, even when scratched; http://news,illinois.edu/news/08/1209coatings.html; Dec. 9, 2008.

(Continued)

*Primary Examiner* — Kevin R Kruer
(74) *Attorney, Agent, or Firm* — Reising Ethington P.C.

(57) ABSTRACT

Microencapsulated chemical(s), as water-soluble solid particles, are embedded in at least one the paint layers on the surface of a magnesium article used in an automobile. If the protective paint film is scratched or otherwise mechanically disturbed to expose the surface of the magnesium article the capsules will be ruptured. This will expose the encapsulated chemical(s) to ambient water enabling them to dissolve and form an aqueous solution capable of reacting with the exposed magnesium to form a protective passivating layer on the exposed magnesium to resist corrosion. In a second embodiment the encapsulated chemicals include a deliquescing compound for extraction of moisture from the atmosphere sufficient to induce dissolution of the passivating layer-forming chemical(s) and trigger the formation of the passivating layer in the absence of ambient water.

14 Claims, 2 Drawing Sheets

(56) References Cited

U.S. PATENT DOCUMENTS

| | | | |
|---|---|---|---|
| 6,075,072 A * | 6/2000 | Guilbert et al. | 523/200 |
| 6,398,989 B1 * | 6/2002 | Bergstrom | 264/8 |
| 7,156,905 B2 * | 1/2007 | Ardelean et al. | 106/14.21 |
| 7,220,342 B2 * | 5/2007 | Sauvant-Moynot et al. | 204/196.37 |
| 8,101,036 B2 * | 1/2012 | Schroeder et al. | 156/73.1 |
| 8,202,036 B1 * | 6/2012 | Edmonson | 414/563 |
| 2006/0091354 A1 * | 5/2006 | van Ooij et al. | 252/70 |
| 2007/0298246 A1 * | 12/2007 | Carballido | 428/332 |
| 2008/0207445 A1 * | 8/2008 | Dexter et al. | 504/100 |
| 2008/0305362 A1 * | 12/2008 | Schroeder et al. | 428/697 |
| 2010/0320421 A1 * | 12/2010 | Calle et al. | 252/388 |
| 2011/0062036 A1 * | 3/2011 | Xie et al. | 206/222 |

FOREIGN PATENT DOCUMENTS

| | | |
|---|---|---|
| EP | 429180 * | 10/1990 |
| WO | 2009087043 | 7/2009 |

OTHER PUBLICATIONS

A.R. Shashikala et al.; Chemical Conversion Coatings on Magnesium Alloys—A Comparative Study; International Journal of Electrochemical Science, vol. 3, pp. 993-1004; 2008.

* cited by examiner

CORROSION INHIBITORS IN BREAKABLE MICROCAPSULES TO PASSIVATE SCRATCHED METALS

TECHNICAL FIELD

This invention relates to the incorporation of passivating chemicals contained in frangible microcapsules in a coating on a corrodible material such that rupture of the coating will release the passivating chemicals and develop a passive film on the exposed corrodible material.

BACKGROUND OF THE INVENTION

Magnesium is a preferred structural material for mass-sensitive applications because of its low density. However magnesium is also chemically active and will readily react with water and oxygen and corrode.

An approach to minimizing the high tendency for magnesium to corrode is to develop an adherent protective coating which will limit access of the corrosive environment to the magnesium metal. Suitable coatings, not all of which are equally effective, may be formed either chemically or electrochemically on the surfaces of magnesium articles and are variously described as passivation coatings, conversion coatings and anodized coatings. These are usually applied through batch or continuous processes conducted by immersion of the treated components in large baths of the appropriate chemicals.

Alternatively, and particularly where it is desired to also convey a pleasing appearance to the article, its surfaces may be painted. In many cases, multiple paint layers may be employed. These layers may be multiple layers of the same paint formulation with multiple coats employed to achieve a desired film thickness. More commonly, the layers will be of differing formulations to convey attributes to the overall painted surface which are not readily combined in a single coating.

An issue common to all of these coatings, however, is that they suppress corrosion through creating a barrier between the magnesium and the chemically active environment. Thus, rupture of a small region of the film such as would result from a scratch or a stone chip will render it ineffective in suppressing corrosion in the vicinity of the rupture. Worse, since corrosion is electrochemical, a scratch or rupture of the film will create a small area which will be anodic to a much larger cathodic area and accelerate and intensify the corrosion at the scratch or rupture.

An exposed magnesium surface may be re-covered with a protective coating to repair or regenerate the coating in the scratched or stone-chipped region. However, the original process used to apply the coating to a component initially may well be unsuited or less suited for repair when the component is part of an assembly or subassembly. Further, because of the highly localized corrosion which results, prompt repair of the coating is required and even the time between the rupture of the coating and the time the rupture is detected might be sufficient to generate unacceptable corrosion.

Thus there is a need for a process for easily and conveniently promptly re-establishing a corrosion-inhibiting coating on magnesium after rupture of a pre-existing film.

SUMMARY OF THE INVENTION

Magnesium articles used in automotive applications are usually painted. It is an object of this invention to incorporate specific water-soluble chemicals in the paint layer. These chemicals are selected for their ability to react, in the presence of water, with a magnesium surface to form a passivating layer suitable for imparting corrosion protection to that magnesium surface. Hence rupture of the paint film which exposes the article's magnesium surface will also expose the incorporated chemicals and enable their dissolution in water to promptly passivate the freshly-created magnesium surface.

In a preferred embodiment the chemicals are contained within micrometer-sized solid particles embedded in the paint and applied in combination with the paint. Since many paints are applied as emulsions comprising water, the particles may be rendered water-insoluble during application by encapsulating them in a protective, yet frangible, polymer shell. Thus treated, the particles will remain non-reactive in normal service but may be activated by mechanical damage to the paint film since this will fracture the polymer shells and expose the encapsulated particles.

Automotive paint comprises a number of layered components which collectively achieve a thickness of about 150 micrometers. The first layer can be electrodeposited from a water-based carrier. Subsequent layers which may include a primer-surfacer, a basecoat and a clearcoat typically employ a water-based carrier and are applied using an electrostatic spray process. Irrespective of the mode of application however, vehicle bodies usually pass through at least one paint baking oven to cure the surface of a freshly painted automobile body, in an enclosed, dust free environment. While the duration of the paint bake process and the operating temperature show some variation with paint formulation, it is not uncommon for the vehicle body to be subjected to minimum temperatures of 275° F. or greater for at least 30 minutes.

It is the intent of this invention to embed the passivating layer-forming chemicals in at least one layer of the paint. Preferably the chemicals will be embedded in the paint layer closest to the magnesium metal surface. This will minimize any unwanted color change in the paint attendant on the introduction of the chemicals and also avoid activation of the chemicals when only superficial paint damage to the paint occurs and the magnesium is not exposed.

The chemicals are encapsulated as dry particulates for compatibility with the paint bake cycle. Capsules containing liquids are readily formed and so it would be feasible to encapsulate the chemicals as water-based solutions. However any water present in the capsule would vaporize under paint bake conditions, possibly expanding and distorting the paint film to render it less aesthetically pleasing or fracturing the capsule to release its contents and contaminating the paint film.

In service it is intended that any disruption of the paint film sufficiently severe to expose the magnesium surface of the article will also fracture the polymer shell of the encapsulated solid particle and expose the contents of the capsule to the environment. When suitably humid or wet conditions are encountered the chemicals contained in the fractured capsules will dissolve in the water present and react with the magnesium to develop the desired passivating layer on the magnesium. It is not anticipated that exposure to water need occur immediately after the paint film is damaged. In the absence of water the chemicals will retain their effectiveness while remaining stably embedded within the paint while promptly performing their intended function when water is available.

It may be noted that the chemicals will be released from the edges of the remaining paint which bounds the damaged area, so the quantity of chemicals accessible for practice of the invention is proportional to the perimeter of the damaged area. The quantity of chemical required to afford full protection however will depend on the area to be protected. Thus this invention offers maximum benefit when the length of the paint perimeter is large or the exposed magnesium area is small, for example a stone chip or a scratch.

In a second embodiment, suitable for conveying protection where the ruptured paint region is not directly exposed to water, deliquescent chemicals are also encapsulated and incorporated in the paint film to absorb airborne moisture and create local wet regions again suitable for promoting passivating layer formation.

DESCRIPTION OF PREFERRED EMBODIMENTS

This invention seeks to incorporate chemicals in the paint film on a magnesium article capable of reacting, in the presence of water, with the underlying magnesium surface if the paint film is mechanically ruptured, scratched or abraded to an extent sufficient to expose the magnesium surface.

Figure 1:
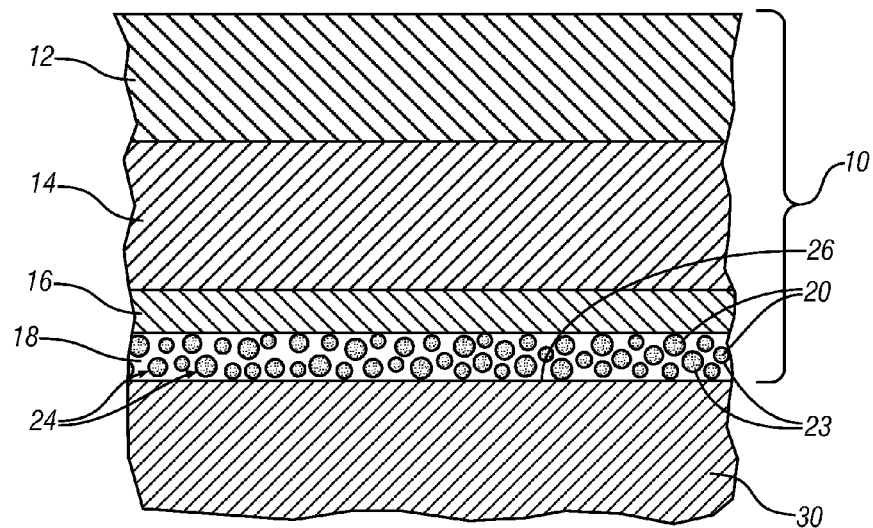
FIG. 1 is an enlarged, fragmentary, schematic, cross-sectional view of a series of layers of paint overlying a magnesium article. Microencapsulated chemicals are shown embedded in the paint layer immediately adjacent to the magnesium surface.
Figure 2:
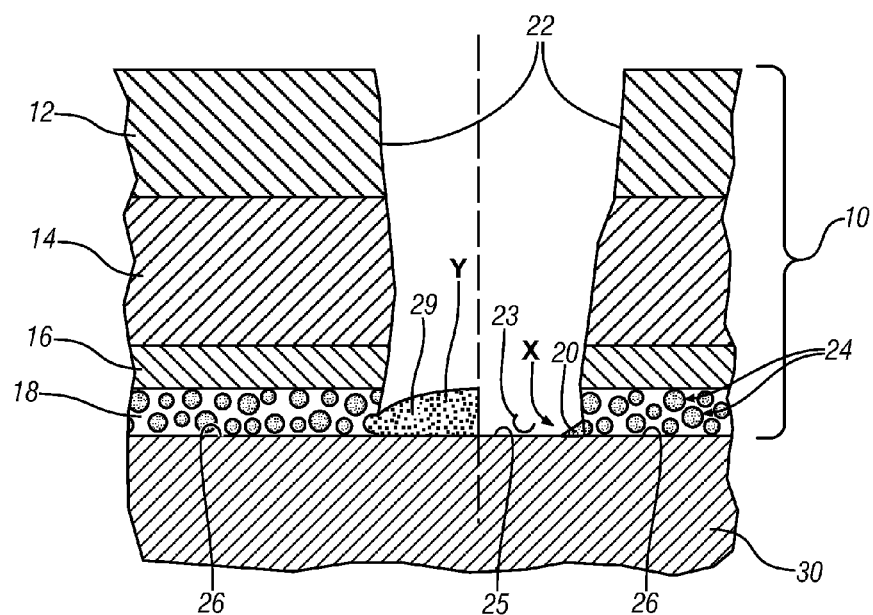
FIG. 2 illustrates an enlarged, fragmentary region as shown in FIG. 1 but further illustrates local removal of all paint layers, for example by scratch, scrape, or stone chip to expose a narrow or small magnesium surface area. The impact causing such damage has fractured those chemical-containing capsules located at the edges of the scratch/scrape releasing the chemicals as shown in partial view at X and with addition of environmental water form a passivating layer-forming solution as shown in partial view at Y.
Figure 3:
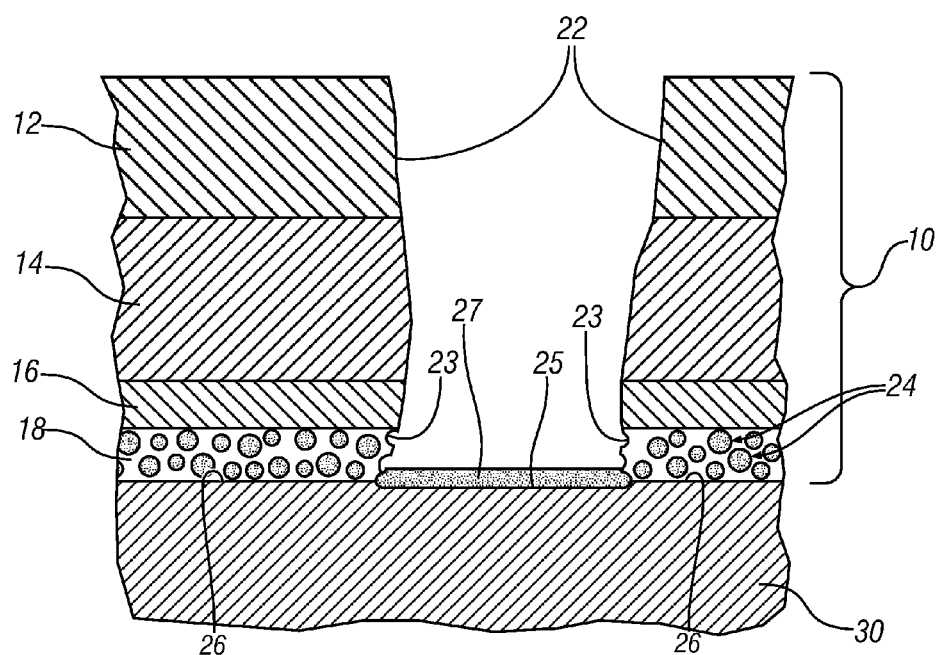
FIG. 3 illustrates the region as shown in FIG. 2 but now shows the formation of a passivating layer on the magnesium surface after the passivating layer-forming solution has reacted with the magnesium surface.

The nature of the invention is depicted in FIGS. 1-3. In FIG. 1, the surface 26 of magnesium article 30 is shown overlaid with four layers of paint 12, 14, 16 and 18, collectively indicated as 10, with layer 18, immediately adjacent to the magnesium surface, incorporating chemical-containing capsules 24 comprising embedded chemicals 20 encapsulated in a protective polymer shell 23. Article 30 may, for example, be an outer door panel of an automobile.

FIG. 2 illustrates the result of a suitably severe paint scratch or abrasion. In many instances the width of the scratch or opening will be up to about one millimeter or up to a few millimeters. A local region of paint 10, bounded by features 22 has been removed, exposing a region 25 of the magnesium surface to the atmosphere and fracturing the protective polymer shells 23 of some of the chemical-containing capsules 24 to expose their contents (embedded chemicals 20) to the atmosphere as shown in partial view at X. Exposure to environmental water will result in dissolution of the chemicals and lead to the formation of a passivating layer-forming solution 29 as shown in partial view at Y.

FIG. 3 illustrates the result of the reaction of passivating layer-forming solution 29 (FIG. 2) with the exposed magnesium surface 25. A passivating layer 27 has formed on the temporarily-exposed magnesium surface 25 to afford protection against corrosion and empty shells of protective polymer 23 remain embedded or partially-embedded in the remnant paint layer 18.

Paint is a mixture of solids and a suitable binder, possibly also incorporating a solvent, which is generally applied to a surface as a thin liquid layer and forms a closely adherent coating on the surface when the liquid layer is 'cured'. Paint formulations vary widely. For example the solvent may be an organic liquid, or water or may be eliminated entirely by applying the paint solids in powder form, relying on electrostatic attraction to build a thin layer. Many automotive paints employ water as a solvent and are referred to as 'water-based'. Irrespective of the solvent however, all automotive paints are cured by at least one exposure to heat in a paint bake oven.

Automotive 'paint' 10 as perceived by a customer comprises multiple paint layers, generally four, represented as layers 12, 14, 16 and 18 in FIG. 1. The first layer, that is the layer immediately adjacent to the metal surface and shown as 18 in FIG. 1, is electrodeposited from a water-based carrier and is intended to convey primarily corrosion protection. Because it is electrodeposited, the process leads to very uniform paint films even in hidden or generally inaccessible regions of the vehicle body. Subsequent layers may include: a primer-surfacer, represented as 16, to smooth out surface irregularities, improve stone-chip performance, and help protect against visible and UV light; a basecoat, represented as 14, the coating layer that provides color and aesthetic effects; and a clearcoat, represented as 12, the coating layer that provides primary protection against environmental effects and imparts gloss and depth to the overall paint finish. All three of these coatings are typically water-based and are applied as liquid sprays. All three coatings may be applied without intermediate high temperature exposure or cure, a procedure commonly described as 'wet on wet', and cured in a single paint bake oven. However, the first-applied, electrodeposited layer is cured separately in a separate paint bake oven prior to applying the remaining layers. Thus typical automobile painting practice will expose painted parts to the elevated temperatures required for paint baking at least twice.

It is known that magnesium will react with selected chemical compounds to form a 'conversion coating' on its surface and that this conversion coating is effective in impeding corrosion of the magnesium and stannate, chromate and cerium oxide coatings, among others, have been developed. Of these, cerium oxide coatings, are most suitable for the practice of this invention since they reliably form at room temperature or about 25° C. and may be developed through reactions of cerium sulfate with magnesium in the presence of a strong oxidizer in an acidic environment. For example, clean magnesium alloy immersed in an aqueous solution of cerium sulfate at a concentration of 5 g/L and hydrogen peroxide at a concentration of 40 mL/L for 3-4 minutes at a pH of 2 will yield a satisfactory coating.

Alternative approaches may be used. For example magnesium alloys have demonstrated superior corrosion resistance when exposed to alkali metal carboxylates with sodium decanoate and sodium undecanoate rendering particularly satisfactory results. Potassium carboxylates may also be used but the sodium salt is generally preferred. Sodium decanoate is effective in neutral aqueous solution and, therefore, offers the advantage of a simpler chemistry than the cerium sulfate approach.

Hence, by sealing these chemicals in suitable concentration in the paint layers of a vehicle, preferably in contact with or in close proximity to the magnesium article surface, rupture of the paint film would simultaneously expose the magnesium surface and the chemicals. Thus the chemicals would be appropriately located to react with the clean magnesium surface just exposed and passivate it to inhibit corrosion.

All the reactions described above occur with the chemicals dissolved in aqueous solution. Technologies have been developed for the encapsulation of liquids in a polymer shell so it is conceptually feasible to incorporate aqueous solutions in a capsule and incorporate the capsule in the paint film. However automotive paints are subject to a 30-60 minute thermal cycle to cure the paint at a temperature of above 275° F. So unless the capsule was exceptionally robust it would swell or rupture leading to irregularities in the paint film.

Thus while encapsulation is desirable to ensure that no reaction ensues between the passivating chemicals and the paint, either in process or in regular service of the article, solid, particulate chemicals should preferably be employed.

For solids, mechanical encapsulation is desirable. This is most readily accomplished by fluidized bed coating in which solids suspended in a fluid flow follow a circulating flow path which repeatedly carries them past a nozzle which dispenses a spray of coating formulation. The solids are then carried out of the deposition zone enabling the coating to solidify either by solvent evaporation or solidification of a hot melt. When the particles have developed the desired coating thickness they are ejected from the bed.

The particle size requirement arises from the desire to locate the particles in the electro-deposited film since in this location they will be adjacent to the magnesium surface and most capable of conveying the barrier layer chemicals to the surface. Typical electro-deposited film thicknesses range from 20 to 30 micrometers and thus to avoid creating irregularities in the film a particle size of about 10 to 15 micrometers is most preferred. The desired configuration is represented in FIG. 1 where suitable chemicals for practice of the invention 20 encapsulated in polymer shells 23 are shown embedded in paint layer 18.

Further it is desirable to co-deposit the corrosion inhibiting particles and paint particles simultaneously. Since the paint particles in the electrocoating process are typically of about 10 micrometers in size, the corrosion-inhibiting particles should be of comparable size to develop similar mobility in the applied field. This approach allows for the concentration of corrosion-inhibiting particles in the electrodeposited layer will substantially equal the concentration of corrosion-inhibiting particles in the liquid paint leading to simpler process control. A less preferred but acceptable location for the particles is in the primer-surfacer layer. This is not as advantageous as the electro-deposited layer since it is further removed from the magnesium surface, but again it is typically a relatively 20-30 micrometer thick layer capable of accommodating particles with minimal if any degradation of paint appearance. Co-deposition of corrosion-inhibiting and paint particles in the primer-surfacer layer will be more readily accomplished due to the mechanical spray deposition process which will also facilitate achieving substantially uniform concentrations of the corrosion-inhibiting particles.

Particles of 10 to 15 micrometers in size may be formed by mechanical methods such as ball milling or by using supercritical fluid processing as is well-known in the art. However, one advantage afforded by supercritical processing is that solutions comprising several chemicals may be processed to create particles incorporating all of the chemical species. Thus it is feasible to form solids comprising all the chemical species required to develop the barrier coating in appropriate concentrations rather than relying on achieving appropriate local concentrations of individually-encapsulated chemicals uniformly on the article.

Similarly, supercritical fluid aided coating is capable of imparting very thin, fractions of a micrometer in thickness, coating layers on particles. Generally the preferred solvent for such supercritical fluid processing is carbon dioxide but water, propane and nitrous oxide may also be used. A variety of polymer coatings may be employed including polyolefin or polystyrene. Alternatively prepolymer precursors such as styrene, acrylic or vinyl compounds may be used in combination with a suitable chemical initiator or exposure to UV light to induce polymerization.

Dispersion polymerization is also a potential coating process. In this process a carrier fluid is a solvent for a monomer but not its polymer. Thus by suspending and agitating particles in a solvent/monomer solution and adding an initiator to promote polymerization a polymer shell builds on the particles. Polymer shell thicknesses of as little as 50 nanometers have been demonstrated.

By uniformly dispersing these microencapsulated chemical entities in a barrier coating, any rupture of the coating will necessarily expose and rupture the microcapsules. Thus they would be available to jointly react with the magnesium to form a passivating coating precisely where it is required without prejudice to their ability to respond to future film ruptures in other regions of the coating. Hence the volume of the microencapsulants and their concentration would be controlled to ensure that an excess of reactants was available in appropriate proportions to fully passivate the magnesium. It is believed that a concentration of 10-20 percent by volume of capsules will be required to achieve this objective.

The nature of the encapsulated chemicals will depend on the chemical system used. A cerium-based approach would require cerium sulfate, as the active chemical, an oxidizer and a pH modifier, a weak to moderate acid. All of these constituents should be available as water-soluble solids at room temperature or about 25° C. Candidate compounds would be sodium nitrite and citric acid. As noted earlier these could be encapsulated and dispensed as individual compounds but it would be preferred to derive solid mixtures of all three constituents in appropriate proportion and encapsulate the mixture.

Approaches based on carboxylates are simpler since the corrosion inhibiting reaction occurs in aqueous solution of neutral pH and the only reactant is the carboxylate. Thus encapsulated sodium decanoate would be suitable for delivering the benefits of this invention.

It has been noted that all of the reactions leading to formation of a corrosion-inhibiting barrier layer occur in aqueous solution. In many cases the water required to dissolve and activate the exposed chemicals created on rupture of the paint layer will be promptly made available by humidity, rain, road splash etc. Hence a protective coating on the magnesium will quickly be reinstated after film rupture. However such prompt creation or restoration of the corrosion-resisting barrier is not a requirement. In extremely dry environments where rain is infrequent and humidity is low, minimal corrosion of the magnesium will occur in the absence of moisture. In any temporary absence of water, the chemicals will retain their effectiveness while remaining stably embedded within the paint awaiting only the presence of water to dissolve and promptly perform their function. In conditions of high humidity but limited rainfall however, it is feasible that the high humidity might promote corrosion of the magnesium but be ineffective in activating the encapsulated chemicals.

To forestall this, in a second embodiment, an additional constituent, a deliquescent, such as calcium chloride, calcium nitrite, magnesium chloride, magnesium nitrate, zinc chloride, lithium sulfide, and magnesium iodide will be added to the encapsulated chemical suite to extract moisture from the air and generate an aqueous pool suited for dissolution and activation of the corrosion-inhibiting chemicals.

The invention has been described in the context of paint practices employed by vehicle manufacturers. It will be appreciated however that in-service damage to the vehicle will generally require the application of fresh paint during the course of repair. It is preferred that such repair not prejudice the corrosion protection afforded by the paint and thus that similar corrosion-inhibiting microencapsulated compounds also be incorporated in paints intended for automotive repair.

Thus, it should be understood that the detailed description and specific examples, while disclosing exemplary embodiments of the invention, are intended to be illustrative of the invention and are not intended to limit its scope.

The invention claimed is:

1. A method of imparting corrosion protection to a painted surface of a magnesium article where the article is exposed to ambient water in use, the corrosion protection to be provided if the paint layer is damaged sufficiently to expose at least a portion of the underlying magnesium surface to ambient water; the method comprising:
   applying a coating of uncured paint to a magnesium surface of the article, the uncured paint coating on the magnesium article surface incorporating a dispersed dry particulate magnesium-passivating chemical composition capable, if the paint coating is damaged and the exposed surface of the magnesium article is wetted with ambient water, of reacting with magnesium at the surface of the article to form a corrosion-inhibiting layer integral with the surface, the dry particulate magnesium-passivating composition being encapsulated in frangible water-insoluble shells and dispersed in the uncured paint coating;
   curing the paint coating to render a solid paint layer containing the dispersed frangible water-insoluble shells, the paint layer being subject to mechanical damage sufficient to damage the cured paint layer and expose the magnesium article surface, such mechanical damage being accompanied by rupture of the frangible shells and release of the magnesium-passivating composition at the damaged paint layer site on the surface of the article where the released magnesium-passivating composition is exposed to ambient water and reacts with the exposed magnesium surface to form the integral corrosion-inhibiting layer.

2. The method of claim 1 wherein the paint layer further comprises a deliquescent compound encapsulated in frangible water-insoluble shells.

3. The method of claim 2 wherein the deliquescent compound comprises at least one of the group consisting of calcium chloride, calcium nitrite, magnesium chloride, magnesium nitrate, zinc chloride, lithium sulfide and magnesium iodide.

4. The method of claim 1 wherein the frangible, water-insoluble shell is a polymer.

5. The method of claim 1 wherein the magnesium-passivating chemical composition comprises a cerium salt.

6. The method of claim 1 wherein the magnesium-passivating chemical composition comprises cerium sulfate.

7. The method of claim 1 wherein the magnesium-passivating chemical composition comprises a cerium salt, an oxidizer and an acid in predetermined proportions for cooperative reaction with magnesium when in aqueous solution.

8. The method of claim 1 wherein the magnesium-passivating chemical compound comprises an alkali metal carboxylate.

9. The method of claim 1 wherein the magnesium-passivating chemical compound comprises sodium decanoate.

10. A method of painting a magnesium article to enhance the corrosion resistance of the article in the event of paint film rupture, the method comprising:
    applying a coating of uncured liquid paint to a surface of a magnesium article, the uncured liquid paint comprising dispersed solids in which a first proportion of the solids comprise at least one dry, solid magnesium-passivating, chemical compound, capable, if the paint film is damaged and the exposed surface of the magnesium article is wetted with ambient water, of reacting with the magnesium surface to form a corrosion-inhibiting layer, wherein the magnesium-passivating chemical is encapsulated in a frangible, water-insoluble shell, and a second proportion of the solids comprising deliquescent compositions is likewise encapsulated in frangible, water-insoluble shells;
    exposing the painted article to a thermal cycle comprising exposure to a temperature of at least 275° F. for at least 30 minutes to render a dry paint film on the surface of the article, the dry paint film containing dispersed, frangible, water-insoluble shells encapsulating first and second proportions of solids, the paint film being subject to mechanical damage sufficient to damage the cured paint layer and expose the magnesium article surface, such mechanical damage being accompanied by rupture of the frangible shells and release of the magnesium-passivating composition and the deliquescent composition at the damaged paint film site on the surface of the article where the released magnesium-passivating composition is exposed to ambient water and reacts with the exposed magnesium surface to form the integral corrosion-inhibiting layer.

11. The method of claim 10 wherein the liquid paint is applied proximate to the surface of the magnesium article.

12. The method of claim 10 wherein the magnesium-passivating chemical compound comprises a cerium salt.

13. The method of claim 10 wherein the magnesium-passivating chemical compound comprises an alkali metal carboxylate.

14. The method of claim 10 wherein the magnesium-passivating chemical compound comprises sodium decanoate.

* * * * *